(12) United States Patent
Hattori

(10) Patent No.: US 7,042,576 B2
(45) Date of Patent: May 9, 2006

(54) POSITIONING STAGE DEVICE

(75) Inventor: Tadashi Hattori, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 340 days.

(21) Appl. No.: 10/349,108

(22) Filed: Jan. 23, 2003

(65) Prior Publication Data

US 2003/0142321 A1    Jul. 31, 2003

(30) Foreign Application Priority Data

Jan. 30, 2002    (JP)    ............................. 2002-021887

(51) Int. Cl.
*G01B 11/02*    (2006.01)

(52) U.S. Cl. .................................... 356/500
(58) Field of Classification Search ................ 356/500, 356/486, 493, 498, 508, 509
See application file for complete search history.

(56) References Cited

U.S. PATENT DOCUMENTS

| | | | | |
|---|---|---|---|---|
| 5,363,196 A | * | 11/1994 | Cameron | .................... 356/500 |
| 5,790,253 A | * | 8/1998 | Kamiya | ....................... 356/500 |
| 5,991,033 A | * | 11/1999 | Henshaw et al. | ........... 356/493 |
| 6,137,574 A | * | 10/2000 | Hill | ............................. 356/493 |
| 6,181,420 B1 | * | 1/2001 | Badami et al. | ............. 356/493 |
| 6,327,039 B1 | * | 12/2001 | de Groot et al. | ............ 356/484 |
| 6,495,847 B1 | * | 12/2002 | Asano et al. | ............... 356/400 |

FOREIGN PATENT DOCUMENTS

JP    11-325832    11/1999

\* cited by examiner

*Primary Examiner*—Hwa (Andrew) Lee
*Assistant Examiner*—Patrick Connolly
(74) *Attorney, Agent, or Firm*—Fitzpatrick, Cella, Harper & Scinto

(57) ABSTRACT

A high speed, wide-range, high-accuracy positioning stage device for eliminating errors due to deterministic elements such as variation of surface machining accuracy of a bar mirror and for preventing error accumulation due to indeterminate elements such as air fluctuations when switching between laser interferometers. When an X1 laser interferometer as a first position measurement device and an X2 laser interferometer as a second position measurement device are switched, at a place at which at least two position measurement devices are activated, when a value is handed over from the X1 laser interferometer, which was activated, to the X2 laser interferometer, which is to be activated, errors due to the effect of X-bar mirror flatness and air fluctuations are found by a correction function for the X-bar mirror and/or a table and the average of the measured values, and the value of the X2 laser interferometer is corrected by a correction device such as a calculation device.

10 Claims, 4 Drawing Sheets

POSITIONING STAGE DEVICE

BACKGROUND OF THE INVENTION

1. Field of the Invention

The present invention relates to a positioning stage device that can be used for a semiconductor exposure device, for example, and driven with very high accuracy over a large area.

2. Description of the Related Art

In semiconductor exposure devices, and especially in step-and-repeat exposure devices (steppers), which are currently the mainstream, light (exposure light), which has passed through an original plate (hereinafter, reticle), on which a pattern desired to be exposed is drawn, is reduced by a constant ratio through a projection optical system (a lens), such that a sensitized agent (photoresist) applied on a base plate (hereinafter, wafer) is exposed. Thereby, the reticle pattern is transferred onto the wafer while the wafer, as a material to be exposed, remains positioned at a predetermined place. This process is repeated over the whole wafer surface. Step-and-scan exposure devices (scanners) are used for exposing a wider area by synchronously scanning a wafer and a reticle, whereas steppers keep the wafer still and perform one-shot exposure.

A positioning stage device for conveying a wafer (hereinafter, wafer stage) must be driven to the desired location on a two-dimensional plane (an XY plane) with high accuracy and over a large area. This is because higher accuracy is increasingly required as the feature size of semiconductor circuits is reduced. Also, because the region covered by a wafer stage drive must be large in order to accommodate the increasing wafer diameter, driving must be performed (i) to a replacement position for replacing the wafers, (ii) for the stage when a mark exposed on the wafer is measured at a place other than the exposure place, etc.

For detecting the position of the wafer stage, a laser interferometer is primarily used. By two-dimensionally arranging laser interferometers, the position of the wafer stage in two dimensions may be performed anytime. That is, as shown in FIG. 2, which is a schematic diagram of the main portion of a wafer stage device capable of moving in a two-dimensional plane according to the related art, a plane mirror for performing X-axis measurement (hereinafter, bar mirror) is mounted to a wafer stage 1 so as to extend in the Y-axis direction. An X laser interferometer 5 for measuring the position of the wafer stage 1 in the X-axis direction detects a relative drive amount of the wafer stage 1 by irradiating a laser beam in parallel with the X-axis onto an X-bar mirror 3 and causing the incoming reflected light to interfere with reference light. Position measurement of the wafer stage 1 in the Y-axis direction is performed in the same manner. By positioning either one of or both of the laser interferometer 5 and a laser interferometer 4 for the X- and Y-axes, the rotational angle θ around the Z-axis of the wafer stage 1 also can be detected.

On the basis of the positional information obtained by the laser interferometers 5 and 4, by arranging actuators (not shown in the figures), such as linear motors, etc., in two dimensions, the wafer stage 1 can be driven to a predetermined position.

When the wafer stage 1 is driven in the X-axis direction, the drive amount in the X-axis direction can be measured by the X laser interferometer 5 and the position in the Y-axis direction can be measured by the Y laser interferometer 4, for measuring a different place on the Y bar mirror. Therefore, problems arise in that the measurable area for the X and Y positions of the wafer stage is determined by the lengths of the X-bar mirror 3 and the Y-bar mirror 2 and that the measurement accuracy is affected by the surface machining accuracy of the bar mirrors 3 and 2.

In order to improve the positioning accuracy of a wafer stage, the machining accuracy of the bar mirrors should be very high. However, as described above, the larger the drive area of the wafer stage, the longer the length required for the bar mirrors 3 and 2. It would be very difficult to machine on the order of nanometers the entire surface of such a long bar mirror.

Accordingly, a method for providing a new laser interferometer is proposed in order to measure a position such as a wafer replacement position or a wafer mark measurement position when driving of a wafer stage over long distances is required.

FIG. 3 is a schematic diagram of major parts of a wafer stage device according to the related art, which is provided with plural laser interferometers for performing stage position measurement, which are arranged in the same direction, which can be switched. In FIG. 3, reference numerals identical to those in FIG. 2 indicate the same components. Referring to FIG. 3, the two-dimensional position of a wafer stage 1 is measured by an X1 laser interferometer 5a and a Y laser interferometer 4. When the wafer stage 1 must move over a long distance in the Y-direction for replacing a wafer, the extended position can be measured by an X2 laser interferometer 5b, installed in parallel with the X1 laser interferometer 5a, and separated by a distance L. Accordingly, by installing laser interferometers separated by some distance, the wafer stage 1 can be driven over a distance longer than the X-bar mirror 3.

Since a laser interferometer is used for measuring the relative displacement, the position cannot be correctly measured unless the reflected light returns each time. That is, the measurement cannot continue unless the reflected laser beam leaving the bar mirror returns. When the reflected light strikes the bar mirror and returns, the laser interferometer requires resetting, and, therefore, the X- and Y-axis interferometers are reset using absolute sensors.

According to the arrangement in FIG. 3, for example, photo switches (not shown) can be arranged at predetermined positions on the X- and Y-axes within an area wherein the position of the wafer stage 1 can be measured by the X1 laser interferometer 5a and the Y laser interferometer 4, and the instant that the wafer stage 1 crosses the predetermined position, the X1 laser interferometer 5a and the Y laser interferometer 4 are reset. Afterward, when the reflected light returns to the laser interferometers 5a and 4, the two-dimensional position of the wafer stage 1 is measured by the X1 laser interferometer 5a and the Y laser interferometer 4.

When the wafer stage 1 is driven to a wafer replacement position, for example, and leaves the measurement area of the X1 laser interferometer 5a, X-position measurement of the wafer stage 1 is performed by the X2 laser interferometer 5b. At that time, an area where the X1 laser interferometer 5a and the X2 laser interferometer 5b can perform position measurement at the same time can be assured by making the distance L between the X1 laser interferometer 5a and the X2 laser interferometer 5b be less than the length of the X-bar mirror 3. When the laser interferometers 5a and 5b for performing X-position measurement are switched, the wafer stage 1 is driven to a place wherein both the X1 laser interferometer 5a and the X2 laser interferometer 5b can perform measurement. This may be performed when the measured value of the Y laser interferometer 4 reaches a predetermined value. Alternatively, installing another sensor is allowed. At this point, the X2 laser interferometer 5b is reset. Then, by handing over the value of the X1 laser interferometer 5a to the X2 laser interferometer 5b, the X1 laser interferometer 5a can be switched to the X2 laser interferometer 5b, regardless of the X position of the wafer stage 1. Afterward, even if the X1 laser interferometer 5a cannot be used for measurement, the X position of the wafer stage 1 can be measured by the X2 laser interferometer 5b, and the wafer stage 1 can perform as if it is freely driven over a distance longer than the X-bar mirror 3. When the X2 laser interferometer 5b is switched to the X1 laser interferometer 5a, the same process can be applied.

As described in the related art, for a wafer stage requiring long distance driving in the Y-direction, by installing plural X laser interferometers (e.g., X1 and X2 laser interferometers) and by switching between them, the wafer stage can be driven for a distance longer than the X-bar mirror 3. When the X1 laser interferometer is switched to the X2 laser interferometer for performing X-axis position measurement, it is preferable that the wafer stage be moved to a place where the X1 and X2 laser interferometers can perform measurement at the same time, the X2 laser interferometer be reset, and the measured value of the X1 laser interferometer be handed over to the X2 laser interferometer.

However, in practice, the bar mirror is not in a perfect plane and has some dispersion arising from the surface machining accuracy. This is called a deterministic element. Accordingly, the error varies according to the place where the laser beam strikes.

FIG. 4 is a drawing for explaining positional measurement errors of a wafer stage device when switching between plural laser interferometers according to the related art. In FIG. 4, the error generated according to the planar shape of the X-bar mirror 3 is a function of the Y-position and is expressed by formula (1):

$$\Delta x = F(y) \quad (1)$$

where, $\Delta x$ is the error in the X-direction and y is the Y-position of the stage.

Assuming that the X1 laser interferometer 5a measures at position Y=0 and the X2 laser interferometer 5b is separated from the X1 laser interferometer 5a by a distance L, the errors of the X1-interferometer 5a and the X2 laser interferometer 5b are respectively expressed as in formula (2):

$$\Delta x1 = F(y)$$

$$\Delta x2 = F(y+L) \quad (2)$$

Accordingly, position measurements made by the X1 interferometer 5a and the X2 laser interferometer 5b have an error difference of $(\Delta x1 - \Delta x2)$, and if the measured value of the X1 laser interferometer 5a is directly handed over to the X2 laser interferometer 5b, that quantity will be added to the error. This may be allowed when the accuracy is high enough, such as when replacing wafers; however, when switching laser interferometers within the exposure region or when performing high-accuracy mark measurement (alignment) outside the exposure region using an off-axis scope, for example, the error $(\Delta x1 - \Delta x2)$ associated with such switching cannot be ignored.

Also, when the value of a laser interferometer is inaccurate (includes an error) due to the effect of air fluctuations, for example, prediction will be impossible, since this case is indeterminate. Further, if it is assumed that the X1 laser interferometer 5a has an error of $\Delta x(1)$, the instant that the X1 laser interferometer 5a is switched to the X2 laser interferometer 5b, the error of the X1 laser interferometer 5a is handed over to the X2 laser interferometer 5b. On the contrary, if it is assumed that the X2 laser interferometer 5b has an error of $\Delta x(2)$ when switching to the X1 laser interferometer 5a, the error of the X1 laser interferometer 5a will be $\Delta x(1) + \Delta x(2)$, and accordingly, the error will be accumulated whenever the laser interferometers are switched over.

SUMMARY OF THE INVENTION

It is an object of the present invention, in view of the related art described above, to provide a high-speed, wide-range, high-accuracy positioning stage device for removing errors due to deterministic elements such as dispersion of surface machining accuracy of bar mirrors and for preventing error accumulation, due to indeterminate elements, such as air fluctuations, when switching over the laser interferometers.

The inventors of the present invention through repeated trial and error, have found that the object described above can be achieved by devices to be described below and have completed the present invention.

In order to achieve the object described above, a positioning stage device according to the present invention includes a stage that can be freely moved over a two-dimensional plane, plural drive devices for driving the stage, and plural position measurement devices for measuring the position of the stage, wherein each of the position measurement devices is formed at least by a plane mirror, which is an object to be measured, mounted to the stage, and interferometers, when the position of the stage is measured by the position measurement device, comprising a correction device for correcting at least one of an error due to a deterministic element caused by the flatness of the plane mirror and an error due to an indeterminate element from the atmosphere of the position measurement device.

According to the present invention, the positioning stage device comprises plural position measurement devices for measuring the position of a stage in at least one axial direction, and including a device for measuring the position of the stage in one axial direction by switching between the plural position measurement devices, wherein the correction device is placed where first and second position measurement devices are effective when the plural position measurement devices are switched, at least one of errors due to deterministic elements and errors due to indeterminate elements being found by a correction function or a table and a value of the second position measurement device to be effective being corrected when the value is handed over from the first position measurement device, which has been effective, to the second position measurement device, which will be effective.

It is preferable that the positioning stage device normally corrects at least one error of errors due to deterministic elements and errors due to indeterminate elements by a correction function or a table during measurement by at least one of a first position measurement device, which has been effective, and a second position measurement device, which will be effective. The correction device is provided with a calculation device capable of including at least a correction function or a table, the calculation device being capable of including special tables corresponding to the first and second position measurement devices.

It is preferable that the correction device calibrates the absolute position of the stage, when the plural position measurement devices are switched for a certain period of time or a certain number of times. The calibration is performed for confirming the absolute position of the stage by a third position measurement device, and the calibration frequency is determined depending on whether positioning accuracy or throughput of the device has priority.

Further objects, features and advantages of the present invention will become apparent from the following description of the preferred embodiments (with reference to the attached drawings).

DESCRIPTION OF THE PREFERRED EMBODIMENTS

Figure 1:
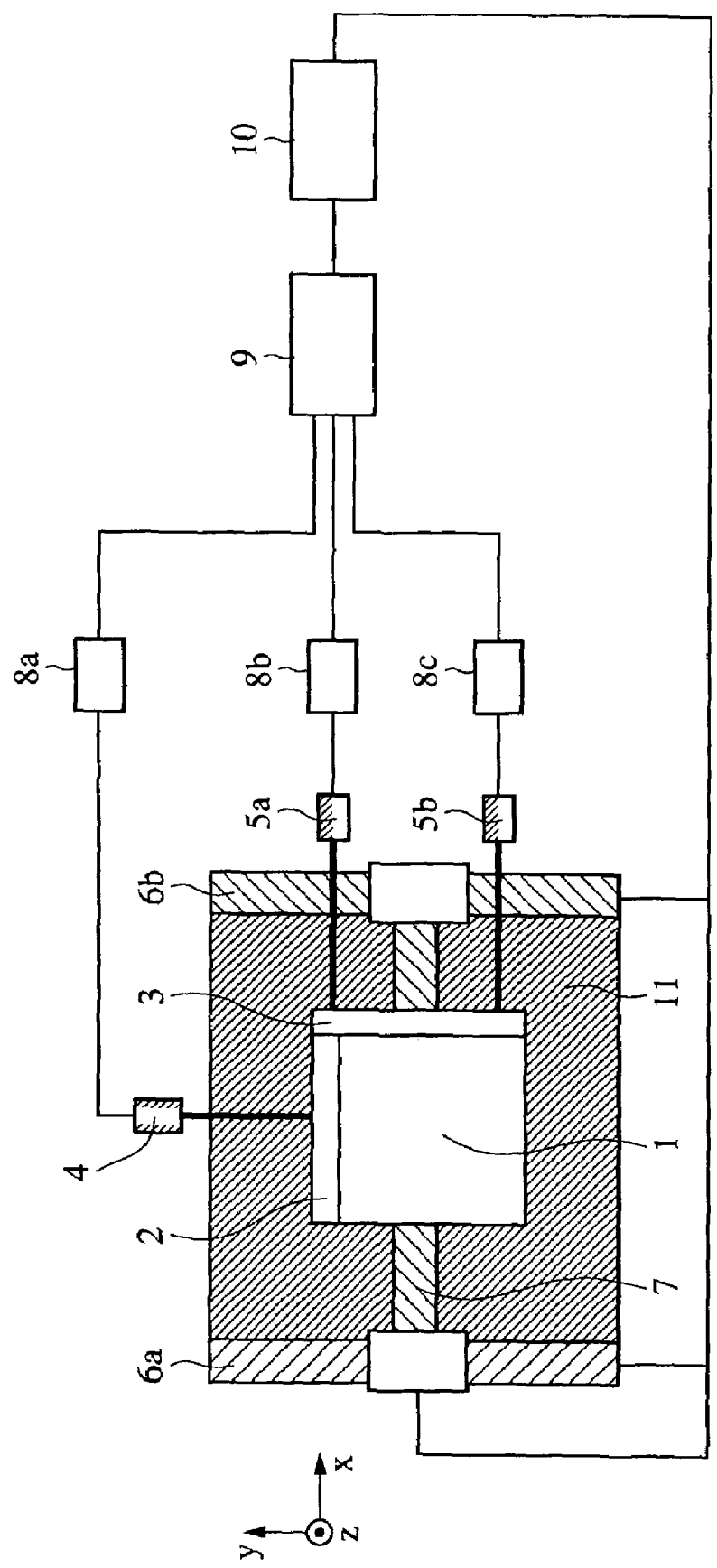
FIG. 1 is a schematic diagram of major parts of a positioning stage device according to an embodiment of the present invention.
Figure 2:
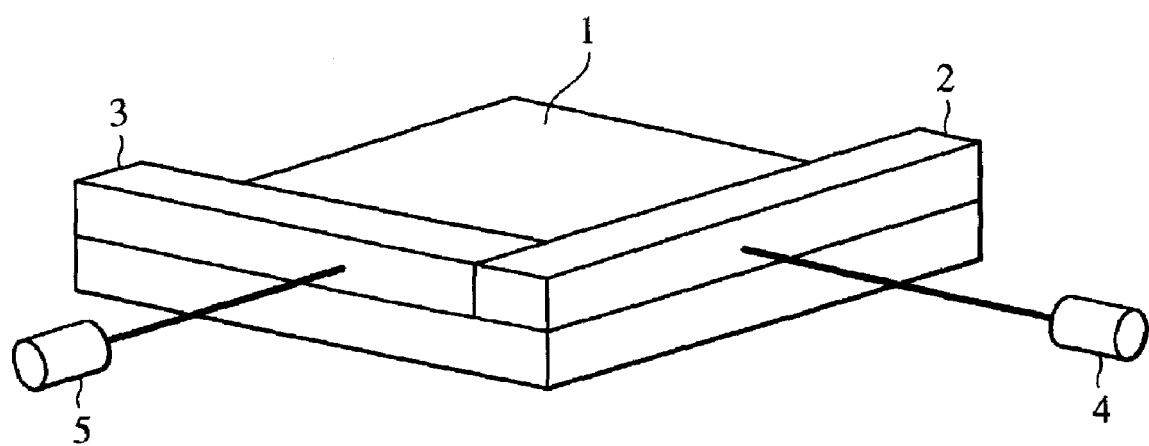
FIG. 2 is a schematic diagram of major parts of a wafer stage device capable of moving in a two-dimensional plane according to the related art.
Figure 2:
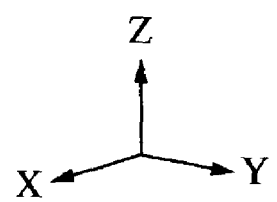
Figure 3:
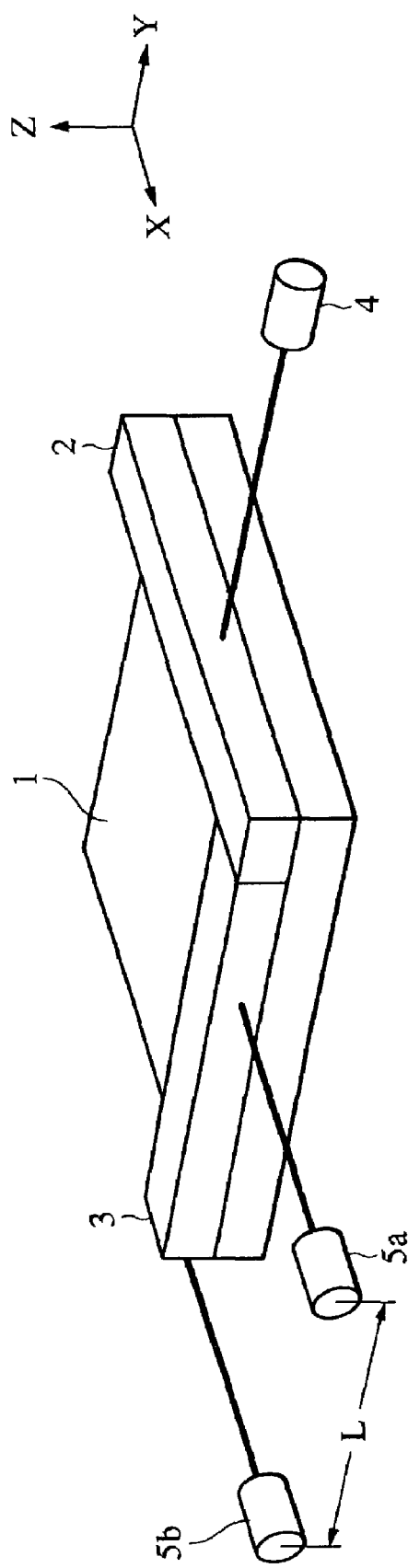
FIG. 3 is a schematic diagram of major parts of a wafer stage device according to the related art, which is provided with plural laser interferometers for performing stage position measurement, which are arranged in the same direction, which can be switched.

Preferred embodiments of the present invention are described in detail while referring to the drawings.

FIG. 1 is a schematic diagram of the main parts of a positioning stage device (a wafer stage, for example, of a semiconductor exposure device) according to an embodiment of the present invention.

Reference numeral 1 indicates a wafer stage. Reference numeral 2 indicates a Y-bar mirror for Y-position measurement which is provided so as to extend in the X-direction in such a manner that a laser beam from a Y laser interferometer strikes the Y-bar mirror 2 (plane mirror) over the whole drivable area along the X-axis. Reference numeral 4 indicates the Y laser interferometer for performing Y-position measurement. A laser beam from the Y laser interferometer 4 strikes the Y-bar mirror 2 and movement of the wafer stage 1 in the Y-direction is detected by interference of the reflected light and reference light (position measurement means is formed). Normally the Y laser interferometer 4 is mounted to a rigid body as a reference of the device. By arranging two Y laser interferometers in parallel, the rotational angle θ around the Z-axis of the wafer stage 1 within the XY plane is measured.

Similarly, reference numeral 3 indicates an X-bar mirror for performing X-position measurement (plane mirror), which is provided so as to extend in the Y-direction. Reference numeral 5a indicates an X1 laser interferometer for performing position measurement in the X-direction when the wafer stage 1 is in an exposure region. Normally, position measurement of the wafer stage 1 is performed by the X1 laser interferometer 5a (first position measurement means). An X2 laser interferometer 5b (second position measurement means) is installed in parallel with the X1 laser interferometer 5a and separated by a distance L. The X2 laser interferometer 5b is used for measuring the X-position of the wafer stage 1 when the wafer stage 1 is arranged at a wafer replacement position or a measurement position of an off-axis scope.

The X-bar mirror 3 is formed to be longer than the distance L between the X1 laser interferometer 5a and the X2 laser interferometer 5b. By setting the margin equal to (moving speed of stage)×(time required for resetting laser beam), when the X1 laser interferometer 5a and the X2 laser interferometer 5b are switched, switching can be performed while driving without stopping the wafer stage 1. By switching between the laser interferometers 5a and 5b for performing X-position measurement, the wafer stage 1 can be driven in the Y-direction over a distance longer than the X bar mirror 3.

Reference numerals 8a, 8b, and 8c indicate, respectively, counter-boards of the Y laser interferometer 4, the X1 laser interferometer 5a, and the X2 laser interferometer 5b. Measured values of the laser interferometers 4, 5a, and 5b are counted by the counter-boards 8a, 8b, and 8c, respectively, and are sent to a calculation device 9. The calculation device 9 may be a generally used calculation device equipped with a processor such as a DSP, a memory, etc. The measured values of the laser interferometers sent from the counter-boards 8a, 8b, and 8c are converted into the present position of the wafer stage 1. At the same time, the calculation device 9 calculates the difference between the present position of the wafer stage 1 and a target position and outputs drive commands for the wafer stage 1 to a driver 10. The driver 10 sends an electrical current to a Y1 linear motor 6a, a Y2 linear motor 6b, and an X linear motor 7 (drive means) according to the commands from the calculation device 9 to drive the wafer stage 1 in the X and Y directions (planar directions). The wafer stage 1 can be two-dimensionally moved on a wafer stage surface plate 11 by an air bearing, for example, without making contact therewith. The correction means according to the present invention is formed by the calculation device 9, the driver 10, etc.

A basic wafer stage structure has been described above. Next, the drive means (drive method) of the wafer stage is described in detail. Since each laser interferometer 4, 5a, and 5b measures the amount of relative movement of an object, the position of the wafer stage 1 cannot be known just after turning on the power. Therefore, for finding the correct position of the wafer stage 1, a sensor (not shown in the drawings) for measuring absolute position may be installed or each laser interferometer 4, 5a, and 5b may be reset when crossing a photo switch, for example, after normally applying a force in a constant direction. By resetting each laser interferometer 4, 5a, and 5b within the measurement area of the X1 laser interferometer 5a, the Y laser interferometer 4 and the X1 laser interferometer 5a start measuring the position of the wafer stage 1. In a normal state, afterward, the position of the wafer stage 1 is normally measured by the Y laser interferometer 4 and the X1 laser interferometer 5a. At that time, an accurate position of the wafer stage 1 is affected by the flatness of the X-bar mirror 3 and the Y-bar mirror 2. Therefore, the error is measured in advance and stored in a memory of the calculation device 9 as a correction function. Then, by calculating the X error at the Y-position and the Y error at the X-position from the correction function using the calculation device 9 and correcting the values of the X laser interferometers 5a and 5b and the Y laser interferometer 4, an accurate position of the wafer stage 1 can be determined.

Here, a case wherein the wafer stage 1 needs to be driven by a large amount in the Y-direction and might exceed the measurement range of the X1 laser interferometer 5a, such as during measurement by an off-axis scope, wafer replacement, for example, is considered. In such a case, it should be known that the wafer stage 1 comes to a position where the X2 laser interferometer 5b can perform measurement at the same time within the measurement area of the X1 laser interferometer 5a. This can be achieved by determining the value of the Y laser interferometer 5 or by installing a separate sensor. At that step, the X2 laser interferometer 5b is reset. At that time, the wafer stage 1 may be stopped, or, for speediness, a method for maintaining driving may also be considered. Since the X2 laser interferometer 5b is reset and the correct X-position of the wafer stage 1 cannot be measured after re-starting measurement, the value of the X1 laser interferometer 5a that has measured the X-position of the wafer stage 1 may be given to the X2 laser interferometer 5b. At that time, if a θ-measurement system of the wafer stage 1 is provided, the X-position of the wafer stage 1 can be more accurately handed over simply by correcting the initial value of the X2 laser interferometer by an amount $θ_L$. Also, due to air fluctuations, for example, the value of the X1 laser interferometer 5a may include errors. For that reason, it is also possible for a central value (average) of the measured values of the X1 laser interferometer 5a for a fixed period to be handed over to the X2 laser interferometer 5b.

However, as described above, due to the effect of the flatness of the X-bar mirror 3, an error may be generated when switching from the X1 laser interferometer 5a to the X2 laser interferometer 5b. Accordingly, the error is calculated and corrected from the corrected bar mirror flatness the instant the X2 laser interferometer 5b becomes measurable. That is, when the correction function is Δx=F(y), a calculated value (correction value) of the value described above using the function is corrected from the measured values of the X1 laser interferometer 5a and the X2 laser interferometer 5b.

That is, when the correct position of the stage is Xt, the measured value of the X1 laser interferometer 5a is X1, the measured value of the X2 laser interferometer 5b is X2, and each error is ΔX1 and Δx2, it can be expressed as in formula (3):

$$Xt = X1 - Δx1$$

$$Xt = X2 - Δx2 \quad (3)$$

Therefore, by formula (4), $$X2 = X1 - Δx1 + Δx2 \quad (4),$$

the correct X-position of the stage can be handed over from and the X1 laser interferometer 5a to the X2 laser interferometer 5b without being affected by the flatness of the bar mirror.

Figure 4:
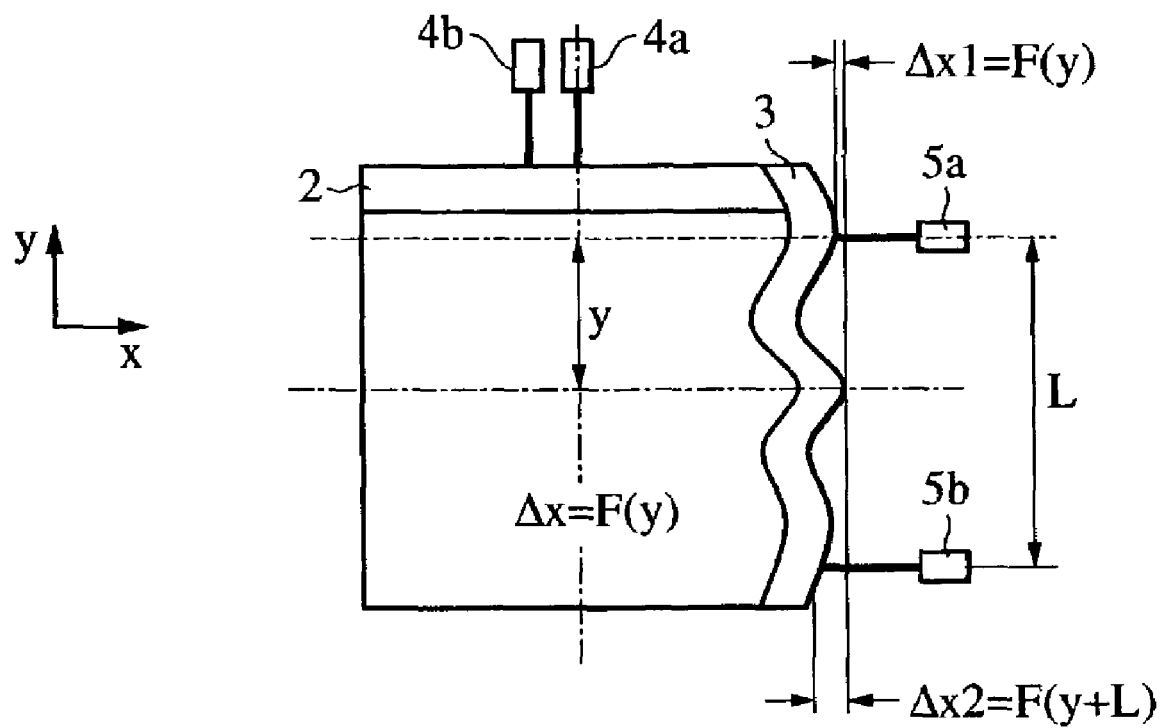
FIG. 4 is a drawing for explaining position measurement errors of a wafer stage device when switching between plural laser interferometers according to the related art.

When switching between the laser interferometers 5a and 5b while driving the wafer stage 1, due to variations in the step speed in the Y-direction or the time required for resetting the X2 laser interferometer 5b, the Y-position of the wafer stage 1 when switching is not always at a fixed place. In that case, normally, by correcting the correction quantity as described above for the measured values of the X1 laser interferometer 5a and the X2 laser interferometer 5b, the X-position of the wafer stage 1 can be correctly handed over regardless of the Y-position of the laser interferometers 5a and 5b when switching. That is, this means that βx2 is normally calculated, adopting a case in which the X2 laser interferometer becomes measurable, as a trigger, and Δx2 is prepared for execution of a calculation shown in FIG. 4 each time. Similarly, when the measured values of the X1 laser interferometer 5a are averaged while driving the wafer stage 1, the correction described above is normally performed. That is, when the X1 and X2 laser interferometers 5a and 5b are averaged, ΔX1 and Δx2 are favorably averaged at the same time. As a result, the correct value of the X1 laser interferometer 5a can be handed over to the X2 laser interferometer 5b without being affected by the flatness of the X-bar mirror 3.

Though one error function (F function) is used for both the X1 and X2 laser interferometers 5a and 5b for the correction when switching between the X1 laser interferometer 5a and the X2 laser interferometer 5b, as described above, the X1 and X2 laser interferometers 5a and 5b may both have respective error functions. That is, the relation between the ΔX1 and Δx2 values is as shown in formula (2) when one error function is used, whereas, when individual error functions are provided, as shown in formula (5), independent error functions of X1 and X2 are respectively measured and equipped with a memory, for example, of the calculation device 9 shown in FIG. 1, and then corrections may be respectively performed.

$$Δx1 = F(y)$$

$$Δx2 = G(y) \quad (5)$$

Here, for example, for the error function of the X-bar mirror 3, a high-order polynomial can be used; however, in a case in which the bar mirror shape is complicated and cannot be approximated by a high-order polynomial, for example, an error table may be provided instead. This is a table in which errors at positions of the stage (sample points) are listed. If the distance between the sample points is reduced, a more accurate bar mirror shape can be exactly expressed. Interpolation of the sample points may be performed by a straight line or by smoothly interpolating with a high-order function. When the Y-position of the stage is determined, since the corresponding ΔX1 and Δx2 values are determined, the table may be considered to be a function in a wider sense.

By the technique described above, deterministic error elements due to the effect of the flatness of the X-bar mirror 3 can be eliminated. However, when the X1 and X2 laser interferometers have errors due to air fluctuations or some other effect (atmosphere of position measurement means, for example), whenever the laser interferometers are switched over, an error is produced due to indeterminate elements, as described above. This can be prevented to some extent by averaging when switching as described above. However, the error is accumulated whenever switching is performed, and as the number of switches increases, the error cannot be ignored. Accordingly, it is preferable that the absolute position of the wafer stage be calibrated occasionally, such as when the laser interferometer is switched a fixed number of times, when the wafer stage is not being used, at a starting point of a lot, etc. (for a fixed period) (a sensor, for example, as a third position measurement device can be used). The frequency of calibration is preferably determined depending on whether the positioning accuracy or the throughput of the device has priority. For calibration means, the absolute deviation of the wafer stage may be measured by observation with a scope, for example, or alternatively, a sensor for measuring the absolute position may be prepared and the wafer stage is then driven to the measurement area of the sensor to measure the error accumulation of the value of the laser interferometer.

As described above, according to a positioning stage device of the present invention, by switching between laser interferometers, in a stage which can be driven over a distance longer than a bar mirror length, an error due to deterministic elements such as the bar mirror flatness, etc., which accompany the switching of the laser interferometers, can be eliminated. At that time, since switching can be performed while the stage is being driven, a positioning stage device capable of controlling high speed, wide-range and high-accuracy stage position can be provided. This can be a positioning stage device that prevents an error due to indeterminate elements, such as air fluctuations, for example, from accumulating when switching between the laser interferometers.

Except as otherwise discussed herein, the various components shown in outline or in block form in the Figures are individually well known and their internal construction and operation are not critical either to the making or using or to a description of the best mode of the invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A positioning stage device comprising: a movable stage;
   positioning measurement means for measuring the position of the stage, the position measurement means comprising first means for measuring the position of the stage and second means for measuring the position of the stage, wherein the first means comprises (i) a plane mirror, which is an object to be measured, mounted to the stage, and (ii) a first interferometer, wherein the second means comprises (i) the same plane mirror and (ii) a second interferometer and wherein each of the first and second interferometers directs light onto the plane mirror;
   correction means for correcting measurement errors of said first and second interferometers caused by the atmosphere of the interferometers and for handing a corrected measuring result from the first interferometer to the second interferometer when the interferometers are switched; and
   calibration means for calibrating an absolute position of said stage after switching a plural number of times.

2. A positioning stage device according to claim 1, wherein said correction means corrects a measurement error of said first and second interferometers caused by the flatness of the plane mirror and hands over a result of correction from one of said first and second interferometers to the other.

3. A positioning stage device according to claim 1, wherein said measurement error is corrected by taking an average of measured values within a fixed time of said first interferometers.

4. A positioning stage device according to claim 1, wherein the correction means calibrates the absolute position of the stage, when the first and second means are switched for a certain period of time or a certain number of times.

5. A positioning stage device according to claim 1, wherein the calibration is performed for confirming the absolute position of the stage by third means for measuring the position of the stage, and a calibration frequency is determined depending on whether positioning accuracy or throughput of the device has priority.

6. A positioning stage device according to claim 1, wherein the first and second interferometers comprise two respective Y laser interferometers for performing Y-position measurement, arranged parallel to each other.

7. A positioning stage device according to claim 1, wherein the first and second interferometers comprise two respective X laser interferometers for performing X-position measurement, arranged parallel to each other and separated by a distance L.

8. A positioning stage device according to claim 7 wherein the plane mirror is longer than the distance L.

9. A positioning stage device according to claim 8, wherein a difference between a length of the plane mirror and the distance L is set to be equal to the product of a moving speed of the stage and a time required for resetting a laser beam of the X laser interferometers.

10. A positioning stage device according to claim 2, wherein said correction means calculates said measurement error caused by the flatness of the plane mirror by a correction function or a table and corrects said measurement error based on a calculated result.

* * * * *